Patented Mar. 24, 1953

2,632,757

UNITED STATES PATENT OFFICE 2,632,757

N-SUBSTITUTED POLYVINYLAMINES

Delbert D. Reynolds and William O. Kenyon, Rochester, N. Y., assignors to Eastman Kodak Company, Rochester, N. Y., a corporation of New Jersey No Drawing. Application August 24, 1950, Serial No. 181,318

14 Claims. (Cl. 260—79.3)

This invention relates to N-substituted polyvinylamines and to a process for their preparation.

This application is a continuation-in-part of our copending applications Serial Nos. 87,575 and 87,576, both filed April 14, 1949 (now U. S. Patent No. 2,531,468, dated November 28, 1950, and U. S. Patent No. 2,531,469, dated November 28, 1950, respectively).

It is known that alkyl or aryl sulfonyl chlorides will react with polyvinyl alcohol in the presence of pyridine to yield polyvinyl sulfonates. For example, E. F. Izard et al. in the Journal of Ind. & Eng. Chemistry, 41, pages 617–621 (1949), describe a process for preparing polyvinyl p-toluene sulfonate by treating polyvinyl alcohol with p-toluenesulfonyl chloride in the presence of pyridine. However, such sulfonation reactions do not go to completion and the polyvinyl sulfonates are binary copolymers consisting predominantly of vinyl sulfonate units combined with some residual vinyl alcohol units.

We have now found that such alkyl or aryl polyvinyl sulfonates are converted readily to N-substituted polyvinylamines by reacting alkyl and aryl polyvinyl sulfonates such as those described in our copending applications with an amine selected from the group consisting of primary and secondary alkylamines and cycloalkylamines or with secondary heterocyclic amines, and separating the product from the reaction mixture. The N-substituted polyvinylamines prepared as above are linear polymers and are characterized by being water-insoluble, but soluble in dilute aqueous acids such as hydrochloric acid, sulfuric acid, acetic acid, chloracetic acid, hydrobromic acid, etc., and function as excellent mordants. In contrast, N-substituted polyvinylamines wherein the N-substituent is an aryl group such as a phenyl group are not soluble in dilute aqueous acid and have limited use as mordants.

It is, accordingly, an object of the invention to provide N-substituted polyvinylamines which are dilute acid-soluble and which function as mordants. Another object is to provide a process for preparing the same. Other objects will become apparent hereinafter.

In accordance with our invention, we prepare the new N-substituted polyvinylamines which are dilute acid-soluble and have excellent mordanting properties from alkyl and aryl polyvinyl sulfonates which are in fact binary copolymers consisting predominantly of vinyl sulfonate units combined with some residual vinyl alcohol units which can be represented by the following structures

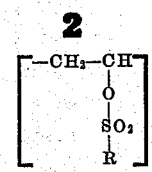

and

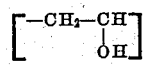

wherein R represents an alkyl, aralkyl or aryl group (e. g. methyl, ethyl, propyl, isopropyl, butyl, benzyl, phenyl, etc. groups) by treating the sulfonate polymer with the desired amine. The proportion of vinyl sulfonate units in the starting materials can vary from 50 to 98% by weight of the polymer, the remainder in each case being vinyl alcohol units. The aminated polymers obtained with primary and secondary amines contain the recurring fundamental structural units

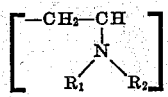

and

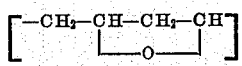

wherein $R_1$ represents an atom of hydrogen, an alkyl group containing from 1 to 4 carbon atoms (e. g. methyl, ethyl, propyl, isopropyl, butyl, etc. groups) and a cycloalkyl group (e. g. a cyclopentyl or cyclohexyl group), and $R_2$ represents similar alkyl and cycloalkyl groups. Unreacted vinyl sulfonate and vinyl alcohol units may be present without materially changing the characteristic properties of dilute acid-solubility and mordanting properties.

The aminated polymers obtained with heterocyclic amines contain the recurring fundamental structural units

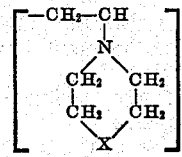

and

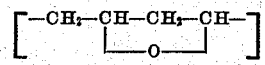

wherein X represents an atom of oxygen or the —$CH_2$— group. Unreacted vinyl sulfonate and vinyl alcohol units may also be present.

Modified N-substituted polyvinylamines of the invention are obtained, if instead of starting with the binary copolymer containing only vinyl sulfonate and vinyl alcohol units, the starting material is a ternary copolymer containing besides vinyl sulfonate and vinyl alcohol units also vinyl acetate units. Starting materials of the latter kind are prepared by first partially hydrolyzing polyvinyl acetate and then sulfonating with an organic sulfonyl chloride. A suitable hydrolyzed polyvinyl acetate is a 1:1 copolymer of vinyl acetate and vinyl alcohol wherein the acetyl group content is 33.3% by weight. On reacting the above kind of ternary copolymers with primary and secondary alkylamines and cycloalkylamines, the aminated products obtained contain the recurring fundamental structural units

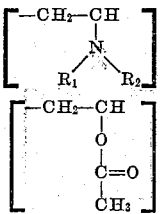

and

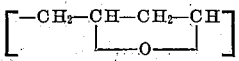

wherein $R_1$ and $R_2$ have the previous definitions. These ternary copolymers are also characterized by being insoluble in water, but soluble in dilute acids (e. g. in aqueous hydrochloric acid) and by having excellent mordanting properties. Unreacted vinyl sulfonate and vinyl alcohol units may be present without materially altering the basic properties of dilute acid-solubility and mordanting properties. On reacting the ternary copolymer starting materials with heterocyclic amines the aminated products obtained contain the recurring fundamental structural units

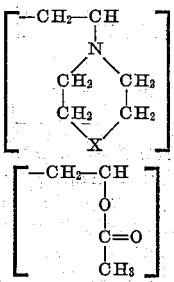

and

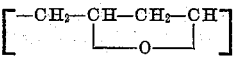

wherein X has the previously defined meaning. These ternary copolymers are likewise characterized by water-insolubility, dilute acid-solubility and excellent mordanting properties. Unreacted vinyl sulfonate and vinyl alcohol units may also be present without markedly altering the above stated properties.

Suitable amines for preparing the described N-substituted polyvinylamines of the invention include primary and secondary alkylamines and cycloalkylamines which are represented by the general formula

wherein $R_1$ and $R_2$ have the previously defined meanings, such as methylamine, ethylamine, propylamine, isopropylamine, butylamine, dimethylamine, diethylamine, dipropylamine, diisopropylamine, dibutylamine, cyclohexylamine, dicyclohexylamine, cyclopentylamine, etc., and secondary heterocyclic amines which are represented by the general formula

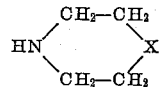

wherein X has the previously defined meaning, such as piperidine, morpholine, etc. The amines are employed in sufficient amount to replace all of the sulfonoxy groups on the polymer chain and to combine with the liberated sulfonic acids to form salts. The reaction requires at least 2 moles of the desired amine to each mole of vinyl sulfonate units in the polymer. However, the reaction is preferably carried out with an excess of the amine of from 3 to 50 times the calculated required amount for complete replacement of all the sulfonoxy groups. The temperature of the reaction is not critical and can vary widely from room temperature to as high as 200° C. The time required for completion of the reaction can also be varied quite widely from approximately an hour or two for higher temperatures to as much as 10 to 15 days for reactions conducted at or near room temperatures.

The following examples will serve to illustrate further our new class of polymeric compounds and the manner of preparing the same.

*Example 1*

30 g. of polyvinyl benzene sulfonate containing over 90% by weight of vinyl benzene sulfonate units and the remainder of vinyl alcohol units were thoroughly dried over $P_2O_5$ in vacuum at room temperature. Anhydrous piperidine (150 cc.) was added to the resin contained in a flask, the flask evacuated and nitrogen added, and the flask tightly stoppered. The reaction mixture was kept at 50° C. for six days. The mixture was then filtered and precipitated into water. The yellow resinous product which separated was dissolved in ether, the solution filtered and poured into water, the precipitate obtained being leached with water and dried. The product was water-insoluble, but soluble in 1% aqueous hydrochloric acid. Analyses gave by weight 72.8% carbon, 10.4% hydrogen, 8.2% nitrogen and only a trace of sulfur indicating thereby that substantially all of the sulfonate groups had been either replaced by amino group or converted to cyclic ether groups. The products contained 65% by weight of vinyl piperidine units as calculated from the nitrogen content.

*Example 2*

10 g. of polyvinyl benzene sulfonate containing 92% by weight of vinyl benzene sulfonate units and 8% by weight of vinyl alcohol units were dried in vacuum in a pressure battle over $P_2O_5$ at room temperature. 75 cc. of anhydrous morpholine were added. The reaction mixture was placed in a 45–50° C. bath for seven days. At the end of this time, the reaction mixture was filtered and precipitated into water. The yellow resin obtained as a precipitate was washed with water and then dried. Analysis gave by weight 7.8% nitrogen, 63.5% carbon, 8.8% hydrogen and no sulfur. It was water-insoluble, but soluble in 1% aqueous hydrochloric acid. The product contained 63% by weight of vinyl morpholine units as calculated from the nitrogen content.

Example 3

10 g. of polyvinyl benzene sulfonate containing 92% by weight of vinyl benzene sulfonate units and 8% by weight of vinyl alcohol units were mixed with 50 cc. of anhydrous cyclohexylamine. The reaction vessel was evacuated and nitrogen added. It was then heated in a steam bath for a period of 16 hours. The reaction solution was then filtered and precipitated by pouring it into a large excess of water. A sticky dark resin separated. After leaching the resin in water, it became granular. It was then washed and dried. The resinous product was insoluble in water, but soluble in dilute aqueous hydrochloric acid. Analysis of the product gave zero sulfur and 7.5% by weight of nitrogen. Accordingly, the product contained 67% by weight of vinyl cyclohexylamine units.

Example 4

10 g. of polyvinyl benzene sulfonate containing 92% by weight of vinyl benzene sulfonate units and 8% by weight of vinyl alcohol units were placed in a pressure bottle and dried over $P_2O_5$ in vacuum at room temperature for 24 hours. Anhydrous n-butylamine (100 cc.) was added, the bottle evacuated and nitrogen added. The reaction mixture was heated at 50° C. for 8 days. The reaction mixture was poured into water and the resin separated as a yellow, gummy mass. After leaching in water for several days, it became hard. This product was insoluble in water, but soluble in dilute aqueous hydrochloric acid. Analysis of the product gave 8.0% of nitrogen by weight and no sulfur. Accordingly, the product contained 57% by weight of vinyl n-butylamine units.

Example 5

10 g. of polyvinyl methane sulfonate containing 93 to 94% by weight of vinyl methane sulfonate units and the remainder of vinyl alcohol units were mixed with 50 cc. of piperidine in a pressure bottle. The bottle was evacuated and nitrogen added. The reaction mixture was heated at 50° C. for 2 days and then filtered. The filtrate was poured into water, and the light brown resin obtained was separated and washed well with water and dried. It was insoluble in water, but soluble in 1% aqueous hydrochloric acid. It analyzed 8.7% by weight of nitrogen and 5.7% by weight of sulfur. These figures indicate that 45% by weight of the polymer were vinyl piperidine units and 22% by weight of vinyl methane sulfonate units, the remainder being cyclic ether and vinyl alcohol units.

Example 6

10 g. of polyvinyl methane sulfonate containing 93 to 94% by weight of vinyl methane sulfonate units and the remainder of vinyl alcohol units were mixed with 50 cc. of anhydrous morpholine in a pressure bottle. The bottle was evacuated and nitrogen added. The resulting mixture was heated at 50° C. for 2 days and then filtered. The filtrate was poured into water, and the yellow resinous precipitate obtained was washed with water and then dried for analysis. The resin was soluble in dilute aqueous solutions of lower fatty acids and inorganic acids such as previously mentioned. The product analyzed 7.0% by weight of nitrogen and 6.6% by weight of sulfur. These figures by calculation correspond to 57% by weight of vinyl morpholine units and 25% by weight of vinyl methane sulfonate units, the remainder being cyclic ether and vinyl alcohol units.

Example 7

10 g. of polyvinyl benzene sulfonate containing 92% by weight of vinyl benzene sulfonate units and 8% by weight of vinyl alcohol units were dried thoroughly and then mixed with 100 cc. of anhydrous cyclohexylamine contained in a pressure bottle. The bottle was evacuated and nitrogen added. The reaction mixture was then heated at 50° C. for 6 days. After cooling, the crystalline cyclohexylamine salt of benzene sulfonic acid separated. This salt was removed by filtration and the filtrate precipitated into water. The water insoluble resin which was obtained was washed with water and dried for analysis. It was soluble in 1% aqueous hydrochloric acid. Analysis gave by weight 73.5% carbon, 9.9% hydrogen, 8.3% nitrogen and 1.0% of sulfur. By calculation the nitrogen content was equivalent to 73% by weight of vinyl cyclohexylamine units. The sulfur content corresponded to approximately 6% of unchanged vinyl benzene sulfonate units.

Example 8

10 g. of polyvinyl benzene sulfonate containing 92% by weight of vinyl benzene sulfonate units and the remainder of vinyl alcohol units were dried over $P_2O_5$ in a pressure bottle and 100 g. of anhydrous ethylamine added. The reaction bottle was sealed and left at room temperature for 10 days. During this time the reaction mixture had become homogeneous. It was filtered and the excess ethylamine allowed to evaporate. The resulting solution was poured into water and the resin separated as a gummy material. It was leached in water until it became finely divided. After thoroughly washing with water it was dried for analysis. This resinous produce was soluble in dilute aqueous acids such as previously mentioned. Analysis of the product gave 8.1% by weight of nitrogen and 2.9% by weight of sulfur. The nitrogen content by calculation was equivalent to 41% by weight of vinyl ethylamine units, while the sulfur was equivalent to 16.7% by weight of unchanged vinyl benzene sulfonate units. Accordingly, the resin contained 42.3% by weight of cyclic ether and vinyl alcohol units.

Example 9

40 g. of polyvinyl benzene sulfonate containing 92% by weight of vinyl benzene sulfonate units and the remainder of vinyl alcohol units were mixed with 300 cc. of anhydrous 1,4-dioxane, 20 cc. of water and 100 g. of anhydrous diethylamine in a sealed flask. The flask was shaken to effect solution and placed in a 60° C. bath for 7 days. The resulting viscous solution was filtered, concentrated to a suitable volume and precipitated into water. The resin obtained as a precipitate was washed with water and dried. It was insoluble in water, but soluble in dilute aqueous acids. Analysis gave 4.2% by weight of nitrogen and 3.6% by weight of sulfur. The above figures correspond to 23% by weight of vinyl diethylamine units and 21% by weight of vinyl benzene sulfonate units, the remainder of the molecule being cyclic ether and vinyl alcohol units.

Example 10

10 g. of polyvinyl methane sulfonate containing 93 to 94% by weight of vinyl methane sulfonate units and the remainder of vinyl alcohol units were mixed with 50 cc. of anhydrous n- butylamine and the mixture placed in a 50° C. bath for 2 days. The reaction mixture was filtered and poured into ether. The butylamine salt of methane sulfonic acid separated as a crystalline material. It was removed by filtration and the filtrate was concentrated to a small volume in vacuum at room temperature. This concentrated solution was precipitated in water and the brown, soft resin obtained leached in water until it hardened. It was then dried for analysis. It was soluble in 1% aqueous hydrochloric acid. Analysis of the product gave by weight 8.3% of nitrogen and 2.3% of sulfur. By calculation the nitrogen content was equivalent to 59% by weight of vinyl n-butylamine units. The sulfur content corresponded to approximately 9% by weight of unchanged vinyl methane sulfonate units.

*Example 11*

10 g. of polyvinyl benzene sulfonate containing 92% by weight of vinyl benzene sulfonate units and the remainder of vinyl alcohol units were dried in vacuum over $P_2O_5$ at room temperature. The resin contained in a pressure bottle was mixed with 100 g. of anhydrous ethylamine. The bottle was sealed and left at room temperature for 7 days. After filtering, the filtrate was concentrated to a thick syrup and poured into water. A gummy precipitate separated which hardened upon continuous leaching in water. It was separated and dried. The product was soluble in dilute aqueous acids such as previously mentioned. Analysis gave by weight 8.1% of nitrogen, 66.4% of carbon, 8.8% of hydrogen and 2.8% of sulfur. By calculation from the nitrogen found, the product contained 41% by weight of vinyl ethylamine units and 16% by weight of unchanged vinyl benzene sulfonate units, the remainder being cyclic ether and vinyl alcohol units.

*Example 12*

40 g. of a vinyl methane sulfonate-vinyl acetate interpolymer containing 40 to 50 mol per cent of vinyl methane sulfonate units were dried over $P_2O_5$ in vacuum and mixed with 200 cc. of anhydrous piperidine in a pressure bottle. After evacuation of the bottle, nitrogen was added and the bottle sealed. It was placed on a tumbler at 50° C. for 24 hours and then left in a 60° C. bath for an additional 72 hours. The resulting reaction mixture was filtered and the filtrate precipitated into water. The yellow, fibrous resin which separated was washed with water and dried in vacuum at room temperature over $P_2O_5$. It was then leached in ether and again dried as before. It was soluble in methanol, pyridine, moist acetone, ethanol containing water, dioxane containing water and in dilute carboxylic acids and dilute inorganic acids, but insoluble in dry acetone, dry dioxane, ether, water and absolute alcohol. Analysis gave by weight 4.0% of nitrogen, 20.4% of acetyl and only a trace of sulfur. These values calculate to 32% by weight of vinyl piperidine units and 41% by weight of vinyl acetate units, the remainder being cyclic ether units.

*Example 13*

20 g. of a vinyl methane sulfonate-vinyl acetate copolymer containing 40 to 50 mol per cent of vinyl methane sulfonate units were dried over $P_2O_5$ in vacuum in a pressure bottle and 150 cc. of anhydrous morpholine added. The bottle was evacuated and nitrogen added. It was sealed and placed in a 60° C. bath for 120 hours. The reaction mixture was then filtered and precipitated into water. The resin which separated was washed with water and dried over $P_2O_5$ at room temperature. A sample was leached in ether and dried. It was soluble in acetone, methanol, pyridine, dioxane, ethanol containing water, and in 1% aqueous hydrochloric acid, but insoluble in water, absolute ethanol and ether. Analysis gave by weight 3.7% of nitrogen, 27.1% of acetyl group and only a trace of sulfur. By calculation these values were equivalent to 30% by weight of vinyl morpholine units and 54% by weight of vinyl acetate units, the remainder of the polymer molecule being cyclic ether units.

*Example 14*

20 g. of a copolymer of vinyl methane sulfonate-vinyl acetate containing 40 to 50 mol per cent of vinyl methane sulfonate units were mixed with 120 cc. of n-butylamine and 30 cc. of water. The mixture was placed in a pressure bottle, evacuated, and nitrogen added. It was then tumbled in a 50° C. bath for 70 hours. The reaction product was then poured into acetone, and the resin which separated was leached in acetone and finally extracted in a Soxhlet with acetone. It was insoluble in water, but soluble in dilute hydrochloric acid. It was then dried and analyzed. The product contained 2.9% by weight of nitrogen and 1.8% by weight of acetyl group and only a trace of sulfur. These values were calculated to be equivalent to 20% by weight of vinyl n-butylamine units and 3.6% by weight of vinyl acetate units, the remainder of the polymer molecule being cyclic ether units.

*Example 15*

20 g. of a copolymer of vinyl methane sulfonate-vinyl acetate containing 40 to 50 mol per cent of vinyl sulfonate units were mixed with 120 cc. of n-butylamine. The mixture was placed in a pressure bottle, evacuated, and nitrogen added. It was tumbled in a 50° C. bath for 70 hours. The reaction mixture was then poured into acetone, and the resin which separated was leached in acetone, extracted in a Soxhlet with acetone and dried. It was insoluble in water, but soluble in dilute aqueous hydrochloric acid. Analysis gave by weight 3.5% of nitrogen, 2.5% of acetyl group and 3.1% of sulfur. The values calculated to 25% by weight of vinyl n-butylamine units, 5% by weight of vinyl acetate units, and 12% by weight of unchanged vinyl methane sulfonate units, the remainder of the polymer molecule being cyclic ether units.

*Example 16*

20 g. of a copolymer of vinyl methane sulfonate-vinyl acetate containing 40 to 50 mol per cent of vinyl methane sulfonate units were placed in a pressure bottle and 200 cc. of Eastman grade piperidine was added. The bottle was evacuated and nitrogen added. It was then placed on a tumbler at 50° C. for 45 hours. The reaction product was poured into water and the resin precipitate obtained dried in vacuum. The resin was soluble in dilute hydrochloric acid. Analysis of the resin gave by weight 3.8% of nitrogen, 21.7% of acetyl group and 4.2% of sulfur. These values calculated to be equivalent to 30% by weight of vinyl piperidine units, 43% by weight of vinyl acetate units and 16% by weight of vinyl methane sulfonate units, the remainder of the polymer being cyclic ether units.

By proceeding as shown in the preceding examples, other N-substituted polyvinylamines of generally similar properties especially as to dilute acid solubility and as to mordanting properties are obtained. For example, useful resinous products are also obtained with alkyl or aryl polyvinyl sulfonates containing by weight 50%, 60%, 70% or 80% of vinyl sulfonate units, the remainder in each case being vinyl alcohol units, on reaction of such starting materials with the mentioned primary and secondary alkylamines or cycloalkylamines or with the mentioned secondary heterocyclic amines. Such resinous products also contain cyclic ether units and, in addition, may also contain some unreacted alkyl or aryl vinyl sulfonate and vinyl alcohol units. Still other resinous products of similar nature, but which are modified by the presence of vinyl acetate units are obtained on reaction of the mentioned amines with starting materials which are essentially copolymers of alkyl or aryl vinyl sulfonates and vinyl acetate, for example, copolymers containing from 1 to 6 alkyl or aryl sulfonate units to each vinyl acetate unit. Such products also contain cyclic ether units and, in addition, may also contain some unreacted alkyl or aryl vinyl sulfonate and vinyl alcohol units.

What we claim is:

1. A process for preparing a water-insoluble, but dilute acid-soluble polymer having mordanting properties and comprising recurring N-substituted vinylamine and cyclic ether groups, which comprises reacting a polyvinyl sulfonate selected from the group consisting of a polyvinyl alkane sulfonate comprising from 50 to 98 per cent by weight of a vinyl alkane sulfonate and from 50 to 2 per cent by weight of vinyl alcohol, a polyvinyl benzene sulfonate comprising from 50 to 98 per cent by weight of vinyl benzene sulfonate and from 50 to 2 per cent by weight of vinyl alcohol and a ternary polyvinyl alkane sulfonate consisting of a vinyl alkane sulfonate, vinyl alcohol and vinyl acetate, wherein the vinyl alkane sulfonate comprises 40 to 50 per cent of the ternary polyvinyl alkane sulfonate, with an organic amine selected from the group consisting of an amine having the general formula:

wherein $R_1$ represents a member selected from the group consisting of an atom of hydrogen, an alkyl group containing from 1 to 4 carbon atoms and a cyclohexyl group and $R_2$ represents a member selected from the group consisting of an alkyl group containing from 1 to 4 carbon atoms and a cyclohexyl group, and an amine having the general formula:

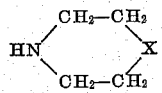

wherein X represents a member selected from the group consisting of an atom of oxygen and a —$CH_2$— group, in the proportions of at least 2 moles of the said amine to each mole of the said polyvinyl sulfonate, at a temperature of from 20° to 200° C., and separating the polymer which forms from the reaction mixture.

2. A process for preparing a water-insoluble, but dilute acid-soluble polymer having mordanting properties and comprising recurring N-substituted vinylamine and cyclic ether groups which comprises reacting a polyvinyl benzene sulfonate, comprising from 50 to 98 per cent by weight of vinyl benzene sulfonate and from 50 to 2 per cent by weight of vinyl alcohol, with an organic amine having the general formula:

wherein $R_1$ represents a member selected from the group consisting of an atom of hydrogen, an alkyl group containing from 1 to 4 carbon atoms and a cyclohexyl group and $R_2$ represents a member selected from the group consisting of an alkyl group containing from 1 to 4 carbon atoms and a cyclohexyl group, in the proportions of at least 2 moles of the said amine to each mole of the said polyvinyl sulfonate, at a temperature of from 20° to 200° C., and separating the polymer which forms from the reaction mixture.

3. A process for preparing a water-insoluble, but dilute acid-soluble polymer having mordanting properties and comprising recurring N-substituted vinylamine and cyclic ether groups, which comprises reacting a polyvinyl benzene sulfonate, comprising from 50–98 per cent by weight of vinyl benzene sulfonate and from 50 to 2 per cent by weight of vinyl alcohol, with piperidine in the proportions of at least 2 moles of the piperidine with each mole of the polyvinyl benzene sulfonate, at a temperature of from 20° to 200° C., and separating the polymer which forms from the reaction mixture.

4. A process for preparing a water-insoluble, but dilute acid-soluble polymer having mordanting properties and comprising recurring N-substituted vinylamine and cyclic ether groups, which comprises reacting a polyvinyl benzene sulfonate, comprising from 50 to 98 per cent by weight of vinyl benzene sulfonate and from 50 to 2 per cent by weight of vinyl alcohol, with morpholine in the proportions of at least 2 moles of the morpholine with each mole of the polyvinyl benzene sulfonate, at a temperature of from 20° to 200° C., and separating the polymer which forms from the reaction mixture.

5. A process for preparing a water-insoluble, but dilute acid-soluble polymer having mordanting properties and comprising recurring N-substituted vinylamine and cyclic ether groups, which comprises reacting a polyvinyl benzene sulfonate comprising from 50 to 98 per cent by weight of vinyl benzene sulfonate and from 50 to 2 per cent by weight of vinyl alcohol, with cyclohexylamine in the proportions of at least 2 moles of the cyclohexylamine to each mole of the polyvinyl benzene sulfonate, at a temperature of from 20° to 200° C., and separating the polymer which forms from the reaction mixture.

6. A process for preparing a water-insoluble, but dilute acid-soluble polymer having mordanting properties and comprising recurring N-substituted vinylamine and cyclic ether units, which comprises reacting a polyvinyl methane sulfonate comprising from 93 to 94 per cent by weight of vinyl methane sulfonate and from 7 to 6 per cent by weight of vinyl alcohol, with n-butylamine in the proportions of at least 2 moles of the n-butylamine to each mole of the polyvinyl methane sulfonate, at a temperature of from 20° to 200° C., and separating the polymer which forms from the reaction mixture.

7. A process for preparing a water-insoluble, but dilute acid-soluble polymer having mordanting properties and comprising recurring N-substituted vinylamine and cyclic ether groups, which comprises reacting a polyvinyl benzene sulfonate comprising 92 per cent by weight of vinyl benzene sulfonate and 8 per cent by weight of vinyl alcohol, with diethylamine in the proportions of at least 2 moles of the diethylamine to each mole of the polyvinyl benzene sulfonate, at a temperature of from 20° to 200° C., and separating the polymer which forms from the reaction mixture.

8. The polymer obtained by the process of claim 1.

9. The polymer obtained by the process of claim 2.

10. The polymer obtained by the process of claim 3.

11. The polymer obtained by the process of claim 4.

12. The polymer obtained by the process of claim 5.

13. The polymer obtained by the process of claim 6.

14. The polymer obtained by the process of claim 7.

DELBERT D. REYNOLDS.
WILLIAM O. KENYON.

REFERENCES CITED

The following references are of record in the file of this patent:

UNITED STATES PATENTS

| Number | Name | Date |
|---|---|---|
| 2,265,450 | Reppe | Dec. 9, 1941 |
| 2,304,637 | Hardy | Dec. 8, 1942 |